United States Patent
Maeda

(10) Patent No.: US 10,242,764 B2
(45) Date of Patent: Mar. 26, 2019

(54) INTERNAL ELECTRODE PASTE

(71) Applicant: Murata Manufacturing Co., Ltd., Nagaokakyo-shi, Kyoto-fu (JP)

(72) Inventor: Yorinobu Maeda, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 64 days.

(21) Appl. No.: 14/964,925

(22) Filed: Dec. 10, 2015

(65) Prior Publication Data

US 2016/0093415 A1 Mar. 31, 2016

Related U.S. Application Data

(63) Continuation of application No. PCT/JP2014/058824, filed on Mar. 27, 2014.

(30) Foreign Application Priority Data

Jul. 29, 2013 (JP) ................. 2013-156457

(51) Int. Cl.
| | |
|---|---|
| H01B 1/22 | (2006.01) |
| H01F 17/00 | (2006.01) |
| H01G 4/30 | (2006.01) |
| H01G 4/008 | (2006.01) |
| H01F 41/04 | (2006.01) |
| H01F 27/28 | (2006.01) |

(52) U.S. Cl.
CPC .......... *H01B 1/22* (2013.01); *H01F 17/0013* (2013.01); *H01F 27/2804* (2013.01); *H01F 41/043* (2013.01); *H01F 41/046* (2013.01); *H01G 4/0085* (2013.01); *H01G 4/30* (2013.01); *H01F 2017/0066* (2013.01); *H01F 2027/2809* (2013.01)

(58) Field of Classification Search
CPC ... H01B 1/22; H01F 17/0013; H01F 27/2804; H01F 41/043; H01F 41/046; H01F 2017/0066; H01F 2027/2809; H01G 4/0085; H01G 4/30
USPC .................................. 252/500, 514
See application file for complete search history.

(56) References Cited

U.S. PATENT DOCUMENTS

2007/0138659 A1 6/2007 Konno

FOREIGN PATENT DOCUMENTS

| CN | 101719395 A | * | 6/2010 |
|---|---|---|---|
| CN | 101719395 A | | 6/2010 |
| JP | H06-322403 A | | 11/1994 |
| JP | 2000-182832 A | | 6/2000 |
| JP | 2000-182833 A | | 6/2000 |
| JP | 2004-079211 A | | 3/2004 |
| JP | 2004079211 A | * | 3/2004 |

(Continued)

OTHER PUBLICATIONS

International Search Report issued for PCT/JP2014/058824, dated Jul. 1, 2014.

(Continued)

*Primary Examiner* — Mark Kopec
*Assistant Examiner* — Danny N Kang
(74) *Attorney, Agent, or Firm* — Arent Fox LLP

(57) ABSTRACT

An internal electrode paste including Ag as a conductor, a resin, and a solvent. Wherein the resin is of a type where 100% of the resin burns in a temperature range that is equal to or lower than a sintering onset temperature of the conductor.

20 Claims, 1 Drawing Sheet

(56) References Cited

FOREIGN PATENT DOCUMENTS

| JP | 2006-302525 | A | | 11/2006 |
|---|---|---|---|---|
| JP | 2006302525 | A | * | 11/2006 |
| JP | 2007-194581 | A | | 8/2007 |

OTHER PUBLICATIONS

Written Opinion of the International Searching Authority issued for PCT/JP2014/058824, dated Jul. 1, 2014.

* cited by examiner

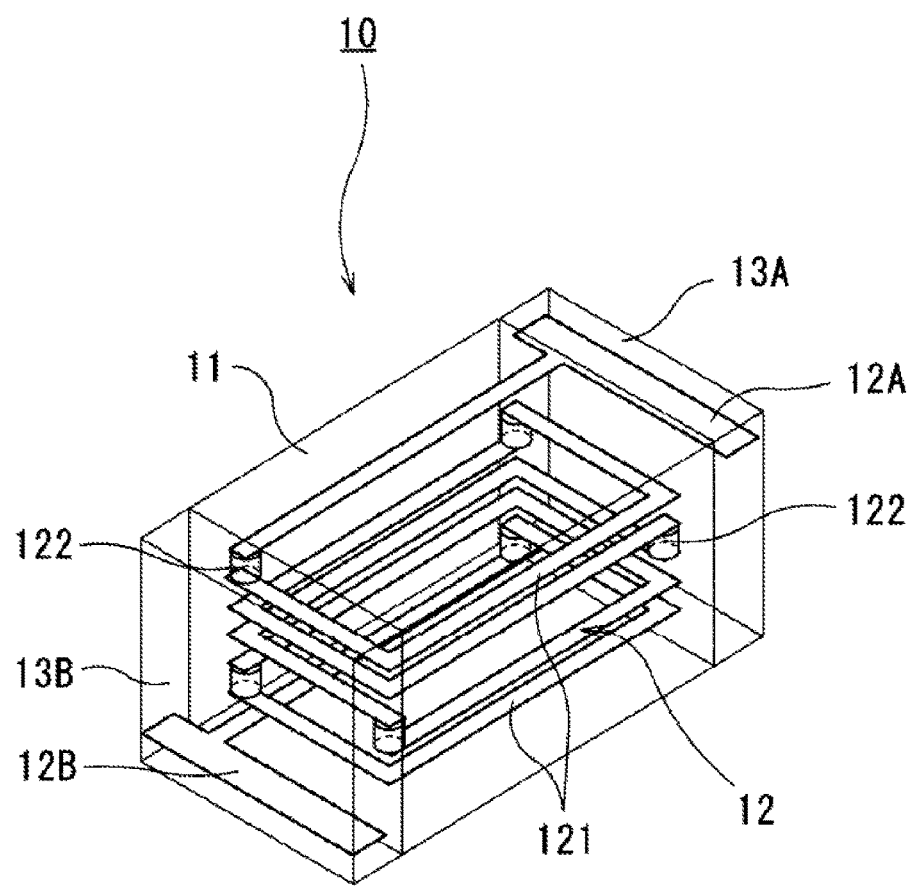

INTERNAL ELECTRODE PASTE

CROSS REFERENCE TO RELATED APPLICATIONS

The present application is a continuation of International application No. PCT/JP2014/058824, filed Mar. 27, 2014, which claims priority to Japanese Patent Application No. 2013-156457, filed Jul. 29, 2013, the entire contents of each of which are incorporated herein by reference.

FIELD OF THE DISCLOSURE

This disclosure relates to an internal electrode paste, and more particularly, to an internal electrode paste which is used for an internal electrode of a multilayer device such as, for example, a ferrite inductor, a multilayer ceramic capacitor, a thermistor, and a piezoelectric element.

BACKGROUND OF THE DISCLOSURE

Against problems such as short circuit defects due to migration of internal conductors in ferrite inductors, Japanese Patent Application Laid-Open No. 2000-182833 (Patent Document 1) discloses a paste containing a silver-palladium alloy with a palladium content of 2 to 8 weight %, and Japanese Patent Application Laid-Open No. 2000-182832 (Patent Document 2) discloses a ferrite sheet with regulated impurities of chlorine and sulfur as a ferrite material for a ferrite inductor. Furthermore, Patent Document 2 discloses a paste containing Ag.

Patent Document 1: Japanese Patent Application Laid-Open No. 2000-182833
Patent Document 2: Japanese Patent Application Laid-Open No. 2000-182832

SUMMARY OF THE DISCLOSURE

When pastes for use as internal electrodes such as internal conductors of ferrite inductors contain Ag, short circuit defects may be caused by diffusion of Ag.

In addition, although there are findings for trying to suppress short circuit defects by addition of palladium microparticles into pastes as disclosed in Patent Document 1, or by adjustment of the amounts of chlorine and sulfur in raw materials for ferrite sheets as disclosed in Patent Document 2, such measures increase the cost.

Therefore, a main object of this disclosure is to provide an internal electrode paste which is less likely to increase the cost, and unlikely to cause a short circuit defect by diffusion of Ag when the paste is used for an internal electrode of a multilayer device.

The internal electrode paste according to an aspect of this disclosure, which is used for an internal electrode, is an internal electrode paste including Ag as a conductor, a resin, and a solvent, wherein the resin is of a type where 100% of the resin burns in a temperature range that is equal to or lower than a sintering onset temperature of the conductor.

In the internal electrode paste according to another aspect of this disclosure, the conductor is of a type from which $SO_2$ and $CO_2$ are generated in an amount of 0.05 wt % or less with respect to a total weight of the conductor in a temperature range that is equal to or higher than the sintering onset temperature of the conductor.

In addition, in the internal electrode paste according to another aspect of this disclosure, the conductor is of a type from which $SO_2$ and $CO_2$ are generated in an amount of 0.01 wt % or less with respect to a total weight of the conductor in a temperature range that is equal to or higher than the sintering onset temperature of the conductor.

Furthermore, in the internal electrode paste according to another aspect of this disclosure, the conductor comprises a water-atomized Ag powder that has a sintering onset temperature of 530° C. or higher.

In addition, in the internal electrode paste according to another aspect of this disclosure, the conductor comprises an atomized powder in which industrial water is used as atomization water, and the resin comprises an ethyl cellulose.

There are some conventional compositions for trying to suppress short circuit defects by addition of palladium microparticles into pastes or adjustment of the amounts of chlorine and sulfur in raw materials for ferrite sheets on the assumption that the diffusion of Ag in the pastes causes short circuits. However, such measures increase the cost.

In contrast, according to an aspect of this disclosure, it has been found that against such short circuit defects, it is preferable that the resin is of type where 100% of the resin in the internal electrode paste preferably burns in a temperature range that is equal to or lower than the sintering onset temperature of the conductor in internal electrodes during firing in air. Therefore, short circuit defects due to diffusion of Ag can be reduced by adopting such a compositional design that the resin is of type where 100% of the resin in the internal electrode paste burns in a temperature range that is equal to or lower than the sintering onset temperature of the conductor in the internal electrode paste during firing in air, which is less likely to increase the cost.

Accordingly, the internal electrode paste according to this disclosure is less likely to increase the cost, and prevents short-circuit defects from being generated when used for internal electrodes of multilayer devices and thus is unlikely to cause short circuit defects.

Furthermore, it has been newly found that a S constituent and a C constituent in the conductor of the internal electrode paste, which remain at high temperature, affect short circuit defects as factors in the internal electrode paste for short circuit defects. Therefore, short circuit defects can be significantly reduced by adopting, in particular, a compositional design for reducing a S constituent and a C constituent remaining in a temperature range that is equal to or higher than the sintering onset temperature for the conductor in the internal electrode paste.

In the internal electrode paste according to another aspect of this disclosure, the conductor is of a type from which $SO_2$ and $CO_2$ are generated in an amount of 0.05 wt % or less with respect to a total weight of the conductor in a temperature range that is equal to or higher than the sintering onset temperature of the conductor. This can further suppress the generation of short circuit defects.

In addition, in the internal electrode paste according to another aspect of this disclosure, the conductor is of a type from which $SO_2$ and $CO_2$ are generated in an amount of 0.01 wt % or less with respect to a total weight of the conductor in a temperature range that is equal to or higher than the sintering onset temperature of the conductor. This reduces the generation of $SO_2$ and $CO_2$ as compared with a case of using the conductor from which $SO_2$ and $CO_2$ are generated in an amount of 0.05 wt % or less with respect to a total weight of the conductor in a temperature range that is equal to or higher than the sintering onset temperature of the conductor, thus allowing the generation of short circuit defects to be further suppressed.

Moreover, in the internal electrode paste according to another aspect of this disclosure, the conductor comprises a water-atomized Ag powder that has a sintering onset temperature of 530° C. or higher. This allows more freedom for organic designs, and at the same time, allows measures against short circuit defects without changing sinterability even when the Ag powder is reduced in particle size, or increasing the internal electrode resistance.

In addition, in the internal electrode paste according to another aspect of this disclosure, the conductor comprises an atomized powder in which industrial water is used as atomization water, and of the resin comprises an ethyl cellulose resin. This can particularly suppress the generation of short circuit defects.

According to this disclosure, an internal electrode paste is achieved which is less likely to increase the cost, and unlikely to cause a short circuit defect by diffusion of Ag when the paste is used for an internal electrode of a multilayer device.

The above-mentioned object, other objects, features, and advantages of this disclosure will be further obvious from the following description with reference to the drawing.

BRIEF EXPLANATION OF THE DRAWINGS

The FIGURE is a perspective view illustrating an example of a ferrite inductor to which this disclosure is applied.

DETAILED DESCRIPTION OF THE DISCLOSURE

The FIGURE is a perspective view illustrating an example of a ferrite inductor to which this disclosure is applied.

A multilayer chip coil component 10 as a ferrite inductor as shown in the FIGURE is a ferrite inductor with excellent temperature characteristics, which includes a magnetic body 11 composed of, for example, a Ni—Zn—Cu-based ferrite material, a coil 12 formed from an internal electrode paste in the magnetic body 11, and a pair of right and left external electrodes 13A, 13B connected to upper and lower electrode parts 12A, 12B of the coil 12, and adapted to cover both end surfaces of the magnetic body 11. The coil 12 is composed of: coil conductors 121 formed horizontally over a number of upper to lower stages; and via hole conductors 122 electrically connecting the upper to lower coil conductors 121, and formed in a rectangular helical shape extending vertically.

In this multilayer chip coil component 10, an internal electrode paste according to an aspect of this disclosure, which includes Ag as a conductor, a resin, and a solvent, wherein the resin is of a type where 100% of the resin burns in a temperature range that is equal to or lower than a sintering onset temperature of the conductor during firing in air, can be used as the internal electrode paste for use in the coil 12 (the coil conductors 121 and the via hole conductors 122) and the electrode parts 12A, 12B.

In the internal electrode paste according to another aspect of this disclosure, the conductor is of a type from which $SO_2$ and $CO_2$ are generated in an amount of 0.05 wt % or less with respect to a total weight of the conductor in a temperature range that is equal to or higher than the sintering onset temperature of the conductor.

In addition, in the internal electrode paste according to another aspect of this disclosure, the conductor is of a type from which $SO_2$ and $CO_2$ are generated in an amount of 0.01 wt % or less with respect to a total weight of the conductor in a temperature range that is equal to or higher than the sintering onset temperature of the conductor.

Furthermore, in the internal electrode paste according to another aspect of this disclosure, the conductor comprises a water-atomized Ag powder that has a sintering onset temperature of 530° C. or higher.

In addition, in the internal electrode paste according to another aspect of this disclosure, the conductor comprises an atomized powder in which industrial water is used as atomization water, and the resin comprises an ethyl cellulose resin.

In the case of the internal electrode paste described above, short circuit defects due to diffusion of Ag can be reduced by adopting such a compositional design that 100% of the resin in the internal electrode paste burns in a temperature range that is equal to or lower than the sintering onset temperature of the conductor in the internal electrode paste during firing in air, which is less likely to increase the cost.

Accordingly, this internal electrode paste is less likely to increase the cost, and prevents short-circuit defects from being generated when used in the ferrite inductor (multilayer chip coil component 10) and thus is unlikely to cause short circuit defects.

In addition, in the internal electrode paste according to another aspect of this disclosure, the conductor is of a type from which $SO_2$ and $CO_2$ are generated in an amount of 0.05 wt % or less with respect to the total weight of the conductor in a temperature range that is equal to or higher than the sintering onset temperature of the conductor. This can further suppress the generation of short circuit defects.

Moreover, in the internal electrode paste according to another aspect of this disclosure, the conductor is of a type from which $SO_2$ and $CO_2$ are generated in an amount of 0.01 wt % or less with respect to the total weight of the conductor in a temperature range that is equal to or higher than the sintering onset temperature of the conductor. This reduces the generation of $SO_2$ and $CO_2$ as compared with the case of using the conductor from which $SO_2$ and $CO_2$ are generated in an amount of 0.05 wt % or less with respect to the total weight of the conductor in a temperature range that is equal to or higher than the sintering onset temperature of the conductor, thus allowing the generation of short circuit defects to be further suppressed.

In addition, in the internal electrode paste according to another aspect of this disclosure, the conductor comprises a water-atomized Ag powder that has a sintering onset temperature of 530° C. or higher. This allows more freedom for organic designs, and at the same time, allows measures against short circuit defects without changing sinterability even when the Ag powder is reduced in particle size, or increasing the internal electrode resistance.

Moreover, in the internal electrode paste according to another aspect of this disclosure, the conductor comprises an atomized powder in which industrial water is used as atomization water, and the resin comprises an ethyl cellulose resin. This may achieve a short-circuit incidence of 0%, and can particularly suppress the generation of short circuit defects.

Next, an example of a method for manufacturing the multilayer chip coil component 10 described above will be described.

First, a plurality of ceramic green sheets are prepared by forming sheets from slurry including ferrite raw materials for a Ni—Zn—Cu based ferrite material by a doctor blade method, for example. Then, after forming via holes in predetermined positions of the appropriate ceramic green sheets, internal electrode pastes according to Examples 1 to 3 and Comparative Examples 1 to 4 in accordance with the compositions (Ag powders A to E, resin A, B, and solvent) shown in Table 1 are applied to the upper surfaces of the ceramic green sheets by a screen printing method or the like, thereby forming predetermined coil patterns.

with a TMA (from Rigaku Corporation). In this case, as measurement conditions, the measurement temperature was adjusted from room temperature to 900° C., the air flow rate was adjusted to 200 ml/min for the measurement atmosphere, and the rate of temperature increase was adjusted to 10° C./min.

TABLE 1

List of Examples 1 to 3 and Comparative Examples 1 to 4 of This Disclosure

| | | Example 1 | Example 2 | Example 3 | Comparative Example 1 | Comparative Example 2 | Comparative Example 3 | Comparative Example 4 |
|---|---|---|---|---|---|---|---|---|
| Composition (wt %) | Ag Powder A | 80 | | | | | | |
| | Ag Powder B | | 80 | | | | | 80 |
| | Ag Powder C | | | | 80 | 80 | | |
| | Ag Powder D | | | 80 | | | | |
| | Ag Powder E | | | | | | 80 | |
| | Resin A | 2 | | | 2 | | 2 | 2 |
| | Resin B | | 2 | 2 | | 2 | | |
| | Solvent | 18 | 18 | 18 | 18 | 18 | 18 | 18 |
| Evaluation Result | Gas Generated at Sintering Onset Temperature or Higher | No | No | Yes | Yes | Yes | Yes | No |
| | Resin Remaining at Sintering Onset Temperature or Higher | No | No | No | Yes | No | No | Yes |
| | Incidence of Short Circuits | 0.00% | 0.04% | 0.19% | 0.48% | 0.45% | 0.56% | 0.36% |

The Ag powders for use in the internal electrode pastes according to Examples 1 to 3 and Comparative Examples 1 to 4 are five types of Ag powder A, Ag powder B, Ag powder C, Ag powder D, and Ag powder E, as shown in Tables 1 and 2.

TABLE 2

Properties of Ag powders

| Type of Ag Powder | | Sintering Onset Temperature (° C.) | Gas Generation at Sintering Onset Temperature or Higher (wt %) | |
|---|---|---|---|---|
| | | | $SO_2$ | $CO_2$ |
| Ag Powder A | High Temperature Sintered Atomized Powder | 530 | N.D. | 0.008* |
| Ag Powder B | Low Temperature Sintered Atomized Powder | 305 | N.D. | 0.010* |
| Ag Powder C | Wet-synthesized Powder 1 | 290 | 0.07 | 0.05 |
| Ag Powder D | Wet-synthesized Powder 2 | 320 | N.D. | 0.05 |
| Ag Powder E | Ceramic-coated Ag Powder | 600 | N.D. | 0.10 |

*measured with a carbon-sulfur analyzer

In this regard, an atomized powder of 2.5 μm in average particle size with industrial water used as atomization water was used as the Ag powder A, an atomized powder of 2.5 μm in average particle size with pure water used as atomization water was used as the Ag powder B, wet-synthesized powders on the order of 2.5 μm in average particle size were used as the Ag powders C, D, and a wet-synthesized and ceramic-coated Ag powder on the order of 2.5 μm in average particle size was used as the Ag powder E.

In regard to the method for evaluating properties of the Ag powders A to E

The sintering onset temperature (° C.) shown in Table 2 for the Ag powders A to E was regarded as a temperature at which the amount of shrinkage exceeded 1% as determined In addition, for the gas generation (wt %) at the sintering onset temperature or higher shown in Table 2 for the Ag powders A to E, the gas generation from the powder of the Ag powder was measured with a TG-MS (from Rigaku Corporation). In this case, as measurement conditions, the temperature range was adjusted from room temperature to 900° C., the He flow rate was adjusted to 150 ml/min for the measurement atmosphere, and the rate of temperature increase was adjusted to 1° C./min. Because the lower detection limit of the TG-MS is 0.01 wt %, the gas generation was measured additionally with the use of a carbon-sulfur analyzer (from Horiba, Ltd.) for the powders from which the generation was equal to or lower than the lower detection limit of the TG-MS. The measurement values measured with the carbon-sulfur analyzer are listed with * put on the right-hand side. In addition, the carbon-sulfur analyzer has a lower detection limit of 0.005 wt %, and the term "N.D." is put in Table 2 for the results of the measurement with the carbon-sulfur analyzer, which are equal to or lower than the lower detection limit of the carbon-sulfur analyzer.

Furthermore, the resins for use in the internal electrode pastes according to Examples 1 to 3 and Comparative Examples 1 to 4 are two types of resin A and resin B, as shown in Table 3.

TABLE 3

Temperature of Completely Burning Resin

| Type of Resin | | Firing Completion Temperature (10° C./min in air) |
|---|---|---|
| Resin A | Ethyl Cellulose Resin | 450° C. |
| Resin B | Acrylic Resin | 295° C. |

In this regard, an ethyl cellulose resin was used as the resin A, and a synthesized acrylic resin was used as the resin B.

In regard to the method for measuring the temperatures of completely burning the resins A, B The burning completion temperature shown in Table 3 for the resins A, B was measured with a TG-DTA (from Rigaku Corporation). In this case, as measurement conditions, the measurement temperature was adjusted from room temperature to 900° C., the air flow rate was adjusted to 200 ml/min for the measurement atmosphere, and the rate of temperature increase was adjusted to 10° C./min. In addition, the temperature at which the decrease in the weight of the resin A (B) reached 99.9% or higher was determined as the burning completion temperature at which 100% of the resin A (B) burned.

Furthermore, terpineol was used for the solvent for use in the internal electrode pastes according to Examples 1 to 3 and Comparative Examples 1 to 4.

Preparation of the Internal Electrode Pastes

Various types of compositions shown in Table 1 were combined, stirred with a planetary mixer, and then dispersed with rolls to produce the internal electrode pastes according to Examples 1 to 3 and Comparative Examples 1 to 4.

In addition, the internal electrode pastes were applied with the use of a screen printing plate, and the internal electrodes were 10 μm in average metal thickness.

The ceramic green sheets with the predetermined coil patterns formed were stacked to reach a required number of sheets, and on both the top and bottom surfaces, ceramic green sheets without any coil pattern formed were stacked, and the sheets were subjected to pressure bonding at a pressure of, for example, 98 MPa to form a pressure-bonded block. Thus, the coil patterns of the respective layers are connected through the via holes to form a multilayer coil.

Then, this pressure-bonded block was cut into a predetermined size to obtain a laminated body. Then, this laminated body was subjected to degreasing treatment, and the degreased laminated body was then subjected to firing at 900° C. to produce a ferrite sintered body (magnetic body). Then, this magnetic body was subjected to end surface treatment, and a conductive paste was then applied to both of the end surfaces, and the resultant was baked at 700° C. to form respective external electrodes. Thus, a multilayer chip coil component is obtained which has the coil built in the magnetic body.

The multilayer chip coil components obtained with the use of the internal electrode pastes according to Examples 1 to 3 and Comparative Examples 1 to 4 were checked on whether there was any gas generated or not at temperatures equal to or higher than the sintering onset temperature, whether there was any resin remaining or not at temperatures equal to or higher than the sintering onset temperature, and incidence of short circuits, and the results are shown in Table 1.

In this regard, for the measurement of the percentage of short circuit defects, the value L was measured for 10000 pieces of the multilayer chip coil components (ferrite inductors) obtained by firing, and the components with the value L decreased by 20% from a reference were regarded as short-circuited articles to calculate the incidence of short circuits.

From the results shown in Table 1, Examples 1 and 2 both refer to compositions in which 100% of the resins burned at temperatures lower than the sintering onset temperatures of the Ag powders. Examples 1 and 2 each with the incidence of short circuits from 0.00% to 0.04% have a satisfactory short-circuit suppression effect relative to Comparative Example 1 of conventional composition.

On the other hand, in regard to Comparative Examples 1 and 4, not 100% of the resins burned before reaching the sintering onset temperatures of the Ag powders, resulting high incidences of short circuits.

In addition, in regard to Comparative Example 3, although 100% of the resin has burned, the generation of $SO_2$ and $CO_2$ is found from the inside of the powder and the incidence of short circuits is high, because of the use of the ceramic-coated wet-synthesized Ag powder as the Ag powder.

As long as the composition according to this disclosure is adopted, the form of the Ag powder is not considered. In particular, however, the atomized powder (Ag powder A) has an extremely thin calcia layer formed on its surface with the use of industrial water as the atomization water, thus undergoes no increase in resistance value due to inorganic impurities in the internal electrode paste, and more preferably, the sintering onset temperature is shifted toward higher temperatures. In addition, the sintering onset temperature is more preferably higher, because there are increased options for the resin.

Japanese Patent Application Laid-Open No. 2009-224201 discloses a conductive paste for a low-temperature fired multilayer board as a paste composed of an atomized powder and a resin, which is similar to the present disclosure, but the paragraph [0015] of the publication includes the description of "being sintered too early when the particle size is less than 0.5 μm", and the description of "being sintered too early with the particle size reduced". The atomized powder produced with the use of industrial water has a surface coated with calcia, and thus has sinterability unchanged even when the particle size is reduced. Therefore, the invention of the publication is considered as an example corresponding to Comparative Example 4 using the atomized powder with a relatively low sintering temperature among the atomized powders.

In addition, in Example 3 in which the internal electrode paste from which $CO_2$ is generated in an amount of 0.05 wt % at temperatures equal to or higher than the sintering onset temperature was evaluated, since the sintering onset temperature of the Ag powder is higher than the temperature of completely firing the resin B, the incidence of short circuits was low as compared with Comparative Example 2.

Furthermore, a greater short-circuit suppression effect is expected if the gas generation is 0.01 wt % or less as in Examples 1 and 2.

From the foregoing results, it is obvious that more effect will be expected for reducing the incidence of short circuits as the gas generation from the powder is reduced.

Example 1 has the greatest short-circuit suppression effect, Example 2 has the next greatest short-circuit suppression effect, and Example 3 has a short-circuit suppression effect, while the effect is slightly deteriorated.

It is to be noted that while the Ni—Zn—Cu based ferrite material is used for the ferrite inductor described above, the internal electrode paste according to this disclosure is also used for internal electrodes of ferrite inductors in which other ferrite materials are used.

Furthermore, the internal electrode paste according to this disclosure is used for not only internal electrodes of ferrite inductors, but also internal electrodes of other multilayer devices such as multilayer ceramic capacitors, thermistors, and piezoelectric elements.

The internal electrode paste according to this disclosure is preferably used for, in particular, internal electrodes of multilayer devices such as ferrite inductors, multilayer ceramic capacitors, thermistors, and piezoelectric elements.

DESCRIPTION OF REFERENCE SYMBOLS 10 multilayer chip coil component (ferrite inductor)
11 magnetic body 12 coil
121 coil conductor
122 via hole conductor
12A, 12B electrode part
13A, 13B external electrode

The invention claimed is:

1. An internal electrode paste comprising:
Ag as a conductor;
a resin; and
a solvent,
wherein the resin is of a type of resin where 100% of the resin burns in a temperature range that is equal to or lower than a sintering onset temperature of the conductor, and the conductor is of a type of conductor from which $CO_2$ and $SO_2$ are generated in an amount of 0.010 wt % to 0.05 wt % with respect to a total weight of the conductor after reaching the sintering onset temperature of the conductor.

2. The internal electrode paste according to claim 1, wherein the amount of the $SO_2$ is 0.0 wt % and the amount of the $CO_2$ is 0.010 wt % with respect to the total weight of the conductor after reaching the sintering onset temperature of the conductor.

3. The internal electrode paste according to claim 1, wherein the conductor comprises a water-atomized Ag powder that has a sintering onset temperature of 530° C. or higher.

4. The internal electrode paste according to claim 2, wherein the conductor comprises a water-atomized Ag powder that has a sintering onset temperature of 530° C. or higher.

5. The internal electrode paste according to claim 1, wherein the conductor comprises an atomized powder.

6. The internal electrode paste according to claim 5, wherein the resin comprises an ethyl cellulose resin.

7. The internal electrode paste according to claim 5, wherein the atomized powder has an average particle size of 2.5 μm.

8. The internal electrode paste according to claim 2, wherein the conductor comprises an atomized powder.

9. The internal electrode paste according to claim 8, wherein the resin comprises an ethyl cellulose resin.

10. The internal electrode paste according to claim 8, wherein the atomized powder has an average particle size of 2.5 μm.

11. The internal electrode paste according to claim 1, wherein the resin comprises an ethyl cellulose resin.

12. The internal electrode paste according to claim 1, wherein resin comprises a synthesized acrylic resin.

13. The internal electrode paste according to claim 1, wherein the solvent is terpineol.

14. The internal electrode paste according to claim 1, wherein the conductor has an average particle size of 2.5 μm.

15. An internal electrode paste comprising:
a sintered and atomized Ag powder as a conductor;
a resin; and
a solvent,
wherein the resin is of a type of resin where 100% of the resin burns in a temperature range that is equal to or lower than a sintering onset temperature of the conductor, and the conductor is of a type of conductor from which $SO_2$ and $CO_2$ are generated in an amount of 0.010 wt % to 0.05 wt % with respect to a total weight of the conductor after reaching the sintering onset temperature of the conductor.

16. The internal electrode paste according to claim 15, wherein the amount of the $SO_2$ is 0.0 wt % and the amount of the $CO_2$ is 0.010 wt % with respect to the total weight of the conductor after reaching the sintering onset temperature of the conductor.

17. The internal electrode paste according to claim 15, wherein the sintered and atomized Ag powder has a sintering onset temperature of 530° C. or higher.

18. The internal electrode paste according to claim 15, wherein the resin comprises one of an ethyl cellulose resin and a synthesized acrylic resin.

19. The internal electrode paste according to claim 15, wherein the solvent is terpineol.

20. The internal electrode paste according to claim 15, wherein the conductor has an average particle size of 2.5 μm.

* * * * *